H. W. LEONARD.
ELECTRICALLY PROPELLED VEHICLE.
APPLICATION FILED APR. 13, 1908.
1,121,382.
Patented Dec. 15, 1914.
3 SHEETS—SHEET 1.
Fig. 1
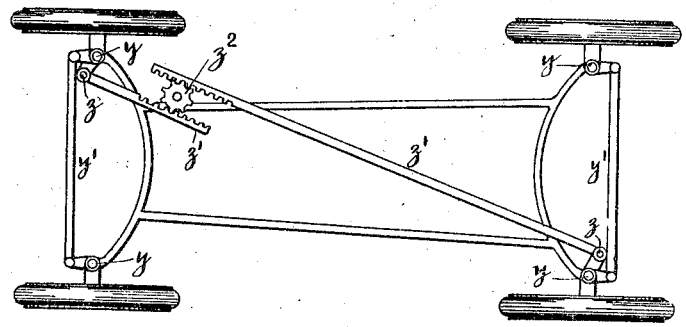
Fig. 2
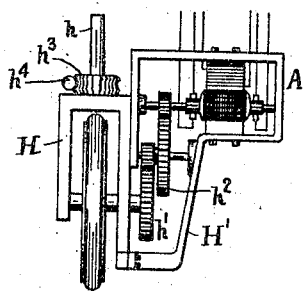
Fig. 3
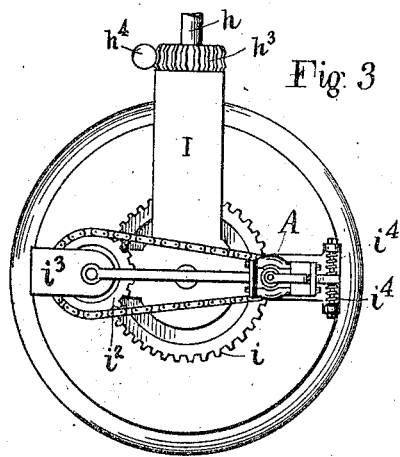
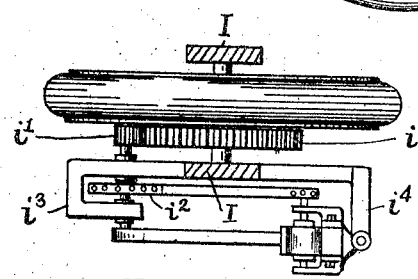
Fig. 4
Witnesses
Geo. A. Hoffman
Geo. N. Kerr
H. Ward Leonard Inventor
By his Attorneys
Edwards, Sager & Wooster

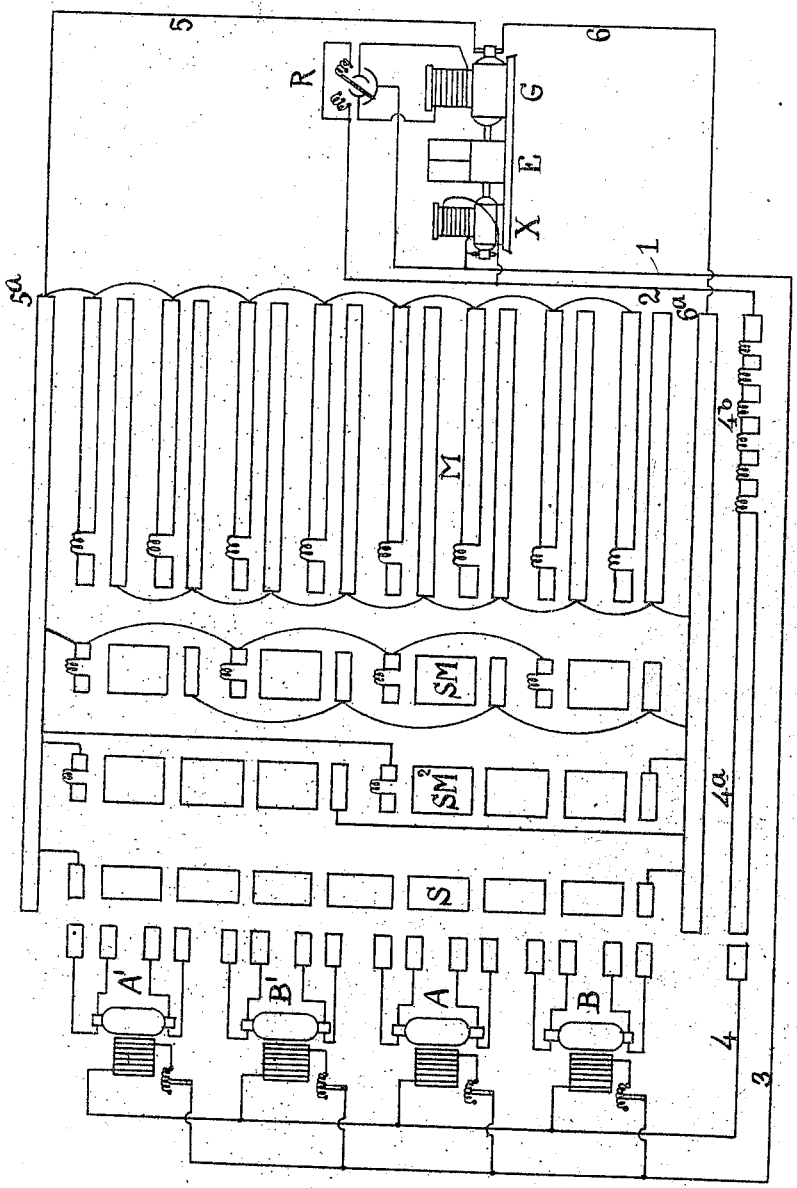

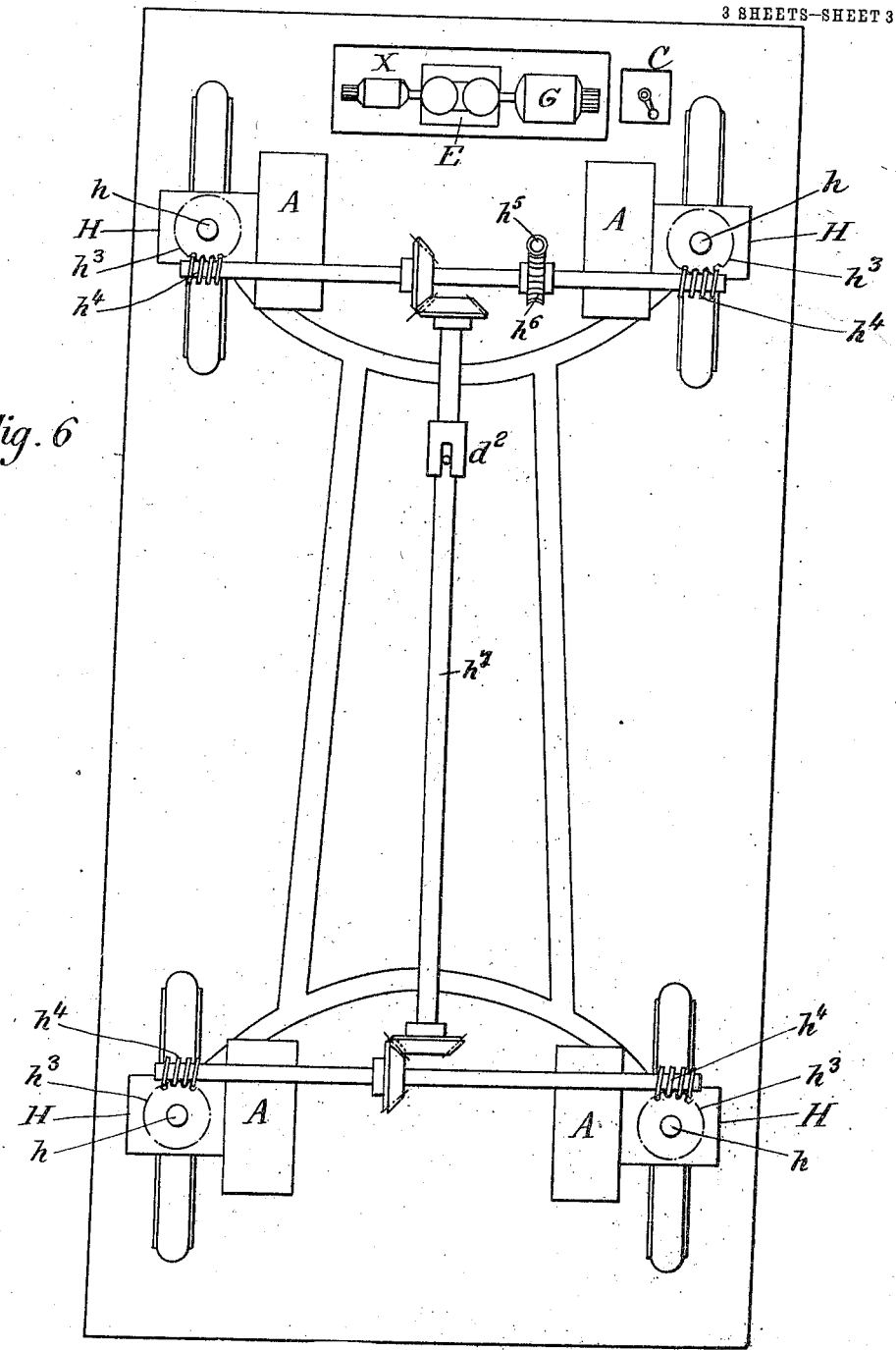

UNITED STATES PATENT OFFICE.

HARRY WARD LEONARD, OF BRONXVILLE, NEW YORK.

ELECTRICALLY-PROPELLED VEHICLE.

1,121,382.　　　　　Specification of Letters Patent.　　Patented Dec. 15, 1914.

Original application filed March 2, 1903, Serial No. 145,686. Divided and this application filed April 13, 1908. Serial No. 426,639.

*To all whom it may concern:*

Be it known that I, HARRY WARD LEONARD, a citizen of the United States, residing at Bronxville, in the county of Westchester and State of New York, have invented certain new and useful Improvements in Electrically-Propelled Vehicles, of which the following is a full, clear, and exact specification.

This application is a division of my pending application Serial No. 145,686, filed March 2, 1903.

My invention relates to various devices and more especially to that class of vehicles in which an engine is employed for driving a dynamo electric machine which supplies energy to one or more propelling electric motors.

The principal object of my invention when applied to vehicles is to secure more perfect control of the speed and tractive effort over the wide range desirable in order to secure the best results in practice.

Further objects of my invention are the reduction of wear, breakage, noise, strain and shock present in apparatus of this general character as heretofore proposed; the utilization of the simplest, cheapest and best form of prime mover under conditions most favorable for its use; and the use of electric motors for propelling the vehicle under conditions most favorable to their efficiency and durability.

The principal features of my invention when applied to vehicles may be briefly stated as follows: I develop upon the vehicle itself by means of a prime mover, such as a gasolene engine, the power employed in the propulsion of the vehicle, and this power is transformed into electric energy, the electromotive force of which is controllable over a wide range at the will of the operator. This electric energy is supplied to one or more propelling motors at such a voltage and current as will cause the vehicle to travel at the speed desired according to the road surfaces and grade met with. In practice the electrical transmission as I employ it replaces the usual mechanical variable or change speed gear, although in some instances I may employ such a gear in addition to the electrical control or electrical transmission gear as it may be termed.

Certain forms of my invention are illustrated in the accompanying drawings, in which—

Figure 1 is a diagrammatic illustration of a steering gear whereby the four traction wheels are controlled for steering purposes; Figs. 2, 3 and 4 are detail views illustrating constructions which may be employed with a vehicle having an independent propelling motor for each traction wheel; Fig. 5 is a diagrammatic view of a series parallel controller and apparatus for a truck employing four propelling motors, and Fig. 6 is a diagram showing the vehicle and apparatus generally.

In Fig. 1, I have illustrated a steering gear which may be employed when each of the four wheels is provided with its own propelling motor. In that arrangement each wheel is nearly vertically pivoted at $y$, and each pair of wheels is connected by a bar $y'$ in the well known manner. To the vertical pivots of diagonally opposite wheels are attached levers $z$ to which levers are attached rack bars $z'$ which mesh with a pinion $z^2$. This pinion is rotated in either direction by any suitable form of steering lever or the pinion may be driven by an electric motor or other suitable form of power, and it will be observed that, whichever direction the pinion is turned in, the four traction wheels will be swung on their pivots in the same direction. Two arrangements of the propelling motors in a vehicle provided with a steering gear as in Fig. 1 are illustrated in Figs. 2, 3 and 4.

In Fig. 2, the traction wheel is journaled in a stirrup H having a vertical pivot pin $h$ which will work in a suitable bearing carried by the frame work. One end of the axle projects through the stirrup and carries a gear wheel $h'$ which meshes with a pinion rigidly connected with gear wheel $h^2$ which in turn meshes with the pinion on the armature shaft of motor A. This motor preferably has its armature provided with two windings and two commutators and a separately excited field as in the arrangement illustrated in Fig. 2 of my original application. The motor and gear wheels $h^2$ are mounted in a frame H' arranged to be mounted on the stirrup H, so that when the stirrup is turned on its pivot in steering, the motor and traction wheel move together. In this figure, I have illustrated a worm wheel $h^2$ on the stirrup with which meshes a worm $h^4$ on an operating rod. This is a modification of the arrangement shown in Fig. 1, and instead of the operating rod receiving a longitudinal motion by means of a rack and pinion, as in Fig. 1, the rod will be rotated by means of a pinion.

In Figs. 3 and 4 is illustrated a modification of the motor support and driving connections. In this arrangement a gear wheel $i$ is secured directly to the wheel and stirrup I is provided with lateral extensions on the inner side. This extension at one side is provided with a bearing for a shaft carrying a pinion $i'$ on the outer end to mesh with gear wheel $i$ and on the inner side of the extension the shaft carries a sprocket wheel $i^2$. The inner end of this shaft works in a bearing carried by arm $i^3$ projecting from the extension of the stirrup. From the right hand extension of the stirrup project two arms $i^4$ between which motor A is suspended between springs. The outer end of the armature shaft is provided with a sprocket wheel which is connected by a chain with wheel $i^2$. The other end of the motor is suspended from arm $i^3$ by a yoke pivoted on a stud in line with the shaft of wheel $i^2$. By this arrangement the weight of the motor is on springs relative to the wheel so as to reduce shock, and at the same time I obtain double reduction in gears between the wheel and motor armature by a simple construction.

In Fig. 5, I have illustrated four propelling motors A, B, A', and B' provided with double wound armatures as in Fig. 2 of my original application. The field windings of these motors are connected in multiple arc relation across circuit 3, 4, with a resistance in series with each winding for the purpose of adjusting the fields relatively to each other. Circuit 3, 4 is connected across circuit 1, 2 extending from exciter X, conductor 4 being attached to a stationary contact adapted to make contact with plates $4^a$, and $4^b$, which are connected with conductor 2, the field winding of generator G is connected across circuit 1, 2 through reversing rheostats R. E represents a two cylinder gasolene engine for driving the machines X and G. The armature circuit 5, 6 from generator G is connected with brushes or other suitable contacts engaging plates $5^a$ and $6^a$, and between these plates are connected a series of moving contacts M, SM, $SM^2$ and S, with which the stationary contacts to which the armature windings of the motors are connected, make contact. With the four sets of contacts arranged as shown, the eight armature windings will be connected in multiple arc relation when the stationary contacts are on plates M; when on plates SM the two windings of each armature will be in series and the four armatures in multiple arc relation; when on plates $SM^2$ the windings will be in two series of four each, that is, the windings of the two forward armatures will be in series and the windings of the two rear armatures will be in series, the two series being connected across the line in multiple arc relation; and when the stationary contacts are on plates S, the eight armature windings will be in series across the line. In this diagram I have shown the intermediate steps supplied with resistances so as to pass smoothly from one arrangement of the armature winding to the next. The arrangement of windings and connections illustrated gives four torques in the ratios of one, two, four, and eight, with a certain number of amperes generated by machine G and constant motor fields. When the windings of the motor armatures are all in multiple the motor fields may be weakened by resistances $4^b$ to obtain a still further range of speed. The electromotive force of the generator can be independently varied from zero to its maximum electromotive force in either sense to vary the energy supplied to the armatures of the propelling motors, and the fields of the propelling motors can also be varied, so as to secure the widest possible range in speed and torque. It will be understood that ordinarily the speed of the vehicle is gradually increased by movement of the controlling switch shown in development in Fig. 5 to the left, giving first the full series connection of the armature windings, then successive series multiple connections, then the full multiple connections of the motor armature windings and then further increase in speed by weakening the fields of the motors by the insertion of resistances $4^b$ in the field circuit of the motor field windings, and that a gradual decrease in speed is obtained by the reverse movement of the controlling switch. It will be seen that if the electromotive force of the generator, or generators supplying energy to the circuit, is lower than that of the opposing electromotive forces in the circuit, as may be the case in going down grades or in retarding the machine, the armature of the generator will be driven as a motor and act to retard or limit the speed of the vehicle to any desired amount. I may therefore cause the vehicle to be retarded by lowering the electromotive force of the generator by weakening its field as by means of the rheostat; the motors will then act as generators and supply energy to the generator which now acts as a motor. Since the vehicle when going down grade can be reversed and caused to back up the grade, it will be apparent that by placing the controlling rheostat at a proper position, a current can be passed from the generator through the motors which will tend to move the vehicle backward up the grade but will be just sufficient to balance the tendency of the vehicle to move down the grade by virtue of its weight. My invention therefore affords a simple arrangement for holding the vehicle stationary when either going up a grade or going down a grade and without the necessity of using brakes.

Fig. 6 illustrates the vehicle and apparatus generally, the parts already described being indicated by the same reference characters and the electric controller being indicated at C. The shafts of the worms $h^4$ for turning the wheels for steering purposes are shown as being controlled by the operator's steering shaft $h^5$ shown as having a worm which engages the gear $h^6$ fixed to the shaft of the forward worms $h^4$, and which shaft also controls through suitable gearing the shaft of the worms $h^4$ for turning the rear wheels. In the intermediate shaft $h^7$ is an endwise sliding sleeve $d^2$ which serves to give flexibility to the shaft and which also may be used to uncouple the shaft when it is not desired to utilize the rear wheels as steering wheels.

While I have shown separate dynamo electric generators and dynamo electric motors as the means for transmitting electrically the energy of the prime mover to the wheels, it will be understood that my invention is not limited to such means but may cover any suitable means for electrically transmitting the power of the prime mover to the driven device or devices.

While I have shown and described certain forms of my invention, it will be understood that the scope of my invention is not confined thereto, and that I am limited only as indicated in the following claims.

Having thus described my invention, I declare that what I claim as new and desire to secure by Letters Patent, is,—

1. In an electrically propelled vehicle, the combination of four propelling wheels, a separate electric motor for driving each propelling wheel, controlling means comprising means for varying the circuit connections of certain of the armature windings relatively to each other and for varying the motor field currents independently of the armature currents, and means for revolving each of the motors and its respective propelling wheel about a vertical axis for steering.

2. In an electrically propelled vehicle, the combination of four electric propelling motors each geared to a propelling wheel, and means for connecting the armatures of said motors in series, series parallel and in parallel and for applying to the armature circuit a voltage variable independently of resistance in the armature circuit while the armatures are connected in any one of said ways.

3. In an electrically propelled vehicle, the combination of four propelling wheels, electric motors for driving said wheels, said motors comprising eight motive windings there being two to each wheel, and means for connecting said windings for obtaining tractive efforts in the ratios of one, two, four and eight, the current from the source of supply being substantially the same for each tractive effort.

4. The combination of a vehicle, a prime mover thereon for supplying power for propelling the vehicle, means comprising a dynamo electric machine for applying power to three or more wheels of the vehicle, said machine having a field winding, another source of electric energy on the vehicle adapted to supply variable energy to said field winding for varying the voltage of said machine, said means also comprising at least three electric motors for electrically driving and electrically braking said wheels respectively, and means for steering each of said wheels to which power is applied.

5. The combination of a vehicle having four wheels, an electric motor for driving each of said wheels, each wheel having its individual driving motor, means for varying the circuit connections of certain of the armature windings relatively to each other and for controlling the current in the field windings of the motors for purposes of speed control, and means for moving said wheels about their respective vertical axes for steering the vehicle.

6. The combination of a vehicle having a plurality of wheels, means comprising a prime mover and a dynamo electric machine for applying power to each of said wheels for driving the vehicle, the voltage of said dynamo being variable over a wide range for purposes of speed control, said means also comprising an individual driving motor for each of said wheels varied in speed by the voltage variation of said dynamo, at least one of said motors being adapted to generate a dynamic braking current under definite control of the operator, and means for moving each of said wheels for steering purposes.

7. The combination of a vehicle, means on said vehicle comprising a prime mover and a variable voltage dynamo electric machine for supplying power for driving the vehicle, a second dynamo electric machine driven by said prime mover and adapted to control the current in a winding of said first named dynamo electric machine for varying the speed of the vehicle, said means also comprising an individual driving motor for each of a plurality of wheels, and means for moving the rear wheels for steering the vehicle and for moving the front wheels for steering the vehicle.

8. The combination of an electrically driven vehicle having front and rear wheels, a plurality of driving electric motors, each motor driving an individual wheel, means under the definite control of the operator for causing at least one of said motors to generate a dynamic controllable braking current, and means for simultaneously moving the front and rear wheels each about their respective vertical axes for steering the vehicle.

9. The combination of an electrically driven vehicle having three or more wheels, means for moving at least three wheels simultaneously while keeping their planes substantially parallel for steering the vehicle, electric motors for driving certain wheels of the vehicle, means on the vehicle for supplying variable voltage energy for operating said motors at variable speeds, and controlling means for varying the circuit connections of certain of the motor windings.

10. The combination of a vehicle, means for supplying electric power for propelling the vehicle comprising a prime mover and a variable voltage dynamo electric generator, an electric motor for applying power to a wheel of the vehicle for propelling the vehicle, means for moving said motor driven wheel and its driving motor for steering the vehicle, and means under the control of the operator for developing a controllable braking current.

11. The combination of a vehicle, a motor for driving a wheel of the vehicle for propelling the vehicle, a spring suspension for said motor independent of the vehicle frame, means for moving said wheel for steering the vehicle, a variable voltage dynamo electric source of energy on the vehicle for supplying energy at variable voltage to the armature of the motor, a second source of energy on the vehicle adapted to supply energy to a winding of said dynamo electric source, and means for varying the electromotive force applied to a winding of said motor for varying its speed.

12. The combination of a vehicle, means for moving a plurality of wheels of the vehicle for steering the vehicle, each of said wheels having a propelling electric motor, means for connecting certain of the motor windings in series and in parallel for controlling the speed, and means for supplying a variable voltage to said windings for controllably braking the vehicle.

13. The combination of a highway vehicle, a gasolene engine thereon for supplying power for propelling the vehicle, dynamo electric means for transmitting the power to at least four propelling wheels of the vehicle, means for varying the voltage of the electric energy supplied for varying the speed of the vehicle and for braking the vehicle, and means for moving at least two of said propelling wheels for steering purposes.

14. The combination of a vehicle, a prime mover thereon, a plurality of propelling wheels, a propelling motor for each of said wheels respectively, dynamo electric means for transmitting power to said motors, means for varying the voltage of the electric energy for the purposes of speed control and braking and for varying the circuit connections of certain of the motor windings for control purposes, and means for turning said propelling wheels for steering purposes.

15. The combination of a vehicle, a prime mover thereon, means for transmitting the power to a plurality of propelling wheels, said means comprising a dynamo electric machine having a separately excited field winding, an additional source of electromotive force on the vehicle for exciting said field winding, means for varying and reversing the current in said field winding for accelerating and braking the vehicle, and means for moving said propelling wheels for steering the vehicle.

16. The combination of a vehicle, a prime mover thereon, electrical means for transmitting the power to a plurality of propelling wheels and for braking the vehicle electrodynamically, said means comprising means for producing electric energy at different voltages, means for varying the connections of certain of the circuits, and means for moving at least one of said propelling wheels for steering the vehicle.

17. In an electrically propelled vehicle, a motor for propelling a wheel of the vehicle, means for mounting said motor with the wheel so as to turn therewith when the wheel is turned for steering purposes, means for turning the wheel together with said motor for steering the vehicle, means on the vehicle for generating electric energy at different voltages and supplying energy at such different voltages to at least one element of the motor for the purpose of securing different speeds, and means under the control of the operator for causing the motor to generate a controllable dynamic braking current.

18. The combination of a vehicle, a motor for driving a wheel of the vehicle, dynamo electric means for developing electric energy on the vehicle, means under the control of the operator for varying the voltage of the energy for the purposes of speed control and for electrically braking the vehicle, power transmitting speed reducing torque increasing means between the motor and said wheel, and means for moving said wheel for steering the vehicle.

19. The combination of a vehicle, an electric motor for driving each of at least three propelling wheels of the vehicle respectively, and means for connecting certain of the motor windings in series and in parallel for controlling the speed of the vehicle and for independently controlling the current in other windings of the motors.

20. In an electrically propelled vehicle, a propelling wheel unit, comprising a wheel, a motor movable with said wheel about a vertical axis, means including an elastic medium for mounting said motor on said wheel, means for generating on the vehicle the electric energy used for propelling the vehicle, and means under the control of the operator for varying the voltage of said energy for the purpose of definite speed control and for electro-dynamically braking the vehicle by a controllable braking effort.

21. A self-propelled vehicle, comprising a plurality of propelling and steering units, each of said units being movable as a whole about its respective vertical axis, each of said units comprising a spring suspended electric motor and a wheel driven thereby, means comprising a prime motor for generating on the vehicle the electric energy used for propelling the vehicle, and means for varying the voltage of said energy for the purpose of speed control during acceleration and retardation of the vehicle.

22. In a self-propelled vehicle, a plurality of self-contained driving units, each of said units comprising an electric motor and a driven element, the armatures of said motors being connected in a common circuit, and means for varying the speed of said motors by varying the voltage impressed upon the said circuit and by varying independently the magnetic field strength of the motors.

23. In a self-propelled vehicle, a unit for propelling and steering the vehicle, said unit comprising an electric motor having a separately excited field winding, means comprising a prime mover for generating on the vehicle the electric energy used for propelling the vehicle, and means for varying the voltage of said energy for the purpose of speed control during acceleration and retardation of the vehicle.

24. In an electrically operated vehicle, a wheel having a coöperating propelling electric motor, said wheel and motor being movable about a substantially vertical axis for steering purposes, and controlling means for causing said motor to generate controllable dynamic electric energy at different voltages less than the maximum voltage for braking the vehicle.

25. In an electrically operated vehicle, a plurality of wheels each having its coöperating propelling electric motor, each wheel and its motor being movable about a substantially vertical axis for steering purposes, and controlling means for changing the circuit connections of certain of the motor windings and for causing the motors to electrodynamically brake the vehicle.

26. In an electrically operated vehicle, three or more wheels each having its coöperating propelling electric motor, each wheel and its motor being movable about a substantially vertical axis for steering purposes, and controlling means for changing the circuit connections of certain of the motor windings and for causing the motors to electrodynamically brake the vehicle.

27. In a power driven vehicle, three or more tractive wheels, means for moving at least three wheels each about a substantially vertical axis for steering purposes, and means comprising an electric generating source of variable voltage for causing each of said wheels to develop electrodynamically a controllable accelerating tractive effort and also a controllable retarding tractive effort.

28. In an electrically propelled vehicle, the combination of four driving and steering wheels, an individual electric motor for driving each of said wheels respectively, each of said motors having a separately excited field winding, a prime motor on the vehicle, a dynamo driven by said prime motor, and means for connecting the motor armatures in parallel with each other under certain operating conditions and in series with each other under other operating conditions and for applying a gradually increasing voltage from a low value to the motor armature circuit when the motor armatures are connected in each of said ways.

29. In an electrically propelled vehicle, a prime motor, a dynamo electric machine, means for controlling said machine for producing electric energy at a controllable gradually variable voltage from a low voltage to a high voltage, a plurality of steerable wheels, an electric motor for individually driving each of said wheels respectively, and means for causing the motor armatures to be supplied with energy at a gradually increasing voltage from a low voltage to a high voltage while the motor armatures are connected in series with each other and also while the motor armatures are connected in parallel with each other.

In testimony whereof I affix my signature, in presence of two witnesses.

HARRY WARD LEONARD.

Witnesses:
B. E. SMYTHE,
GEO. N. KERR.